United States Patent
Anguelov

(10) Patent No.: US 7,769,716 B2
(45) Date of Patent: Aug. 3, 2010

(54) DIVIDED BACKUP OF DATA WAREHOUSE

(75) Inventor: Trifon M. Anguelov, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 306 days.

(21) Appl. No.: 11/691,922

(22) Filed: Mar. 27, 2007

(65) Prior Publication Data
US 2008/0243949 A1 Oct. 2, 2008

(51) Int. Cl.
*G06F 7/00* (2006.01)
(52) U.S. Cl. ......................... 707/640; 707/650
(58) Field of Classification Search .................. None
See application file for complete search history.

(56) References Cited
U.S. PATENT DOCUMENTS

| | | | |
|---|---|---|---|
| 6,728,699 B1 * | 4/2004 | Lautzenheiser et al. | 707/3 |
| 7,197,520 B1 * | 3/2007 | Matthews et al. | 707/204 |
| 2007/0083563 A1 * | 4/2007 | Souder et al. | 707/200 |

OTHER PUBLICATIONS

Lee et al., "Technical Report : Cloning Oracle® E-Business Suite Using SnapMirror®", Jan. 15, 2004, Downloaded from http://www.netapp.com/library/tr/3300.pdf, Feb. 15, 2007.
Network Appliance Inc., "Network Appliance™ Technology Deployment at Oracle: Making Complex Storage Environments Simpler to Manage with a Low TCO", Aug. 2004, Downloaded from http://www.netapp.com/library/tr/3330.pdf, Feb. 15, 2007.
Network Appliance Inc., "Network Appliance™ Snapmirror® Software", (c) 2006, Downloaded from http://www.netapp.com/ftp/snapmirror.pdf, Feb. 15, 2007.

* cited by examiner

*Primary Examiner*—Charles Rones
*Assistant Examiner*—Belix M Ortiz
(74) *Attorney, Agent, or Firm*—Weaver Austin Villeneuve & Sampson LLP

(57) ABSTRACT

A data warehouse characterized by a plurality of fact tables and at least one dimension table is backed up. For fact tables that are static, those fact tables are backed up using a first backup method that is, for example, optimized for static data. For example, the first backup method may be at the file system level, below the database level, and can be a very time and computationally efficient way to synchronize blocks of data. Thus, for example, the first method may be a method that is not "database-aware" and does not consider the database structure in its backup processing. For fact tables that are dynamic, those fact tables are backed up using a second backup method. For example, the second backup method may account for the dynamic nature of data in the portion being backed up by being, for example, "database aware." In addition, the at least one dimension table is backed up. By treating the fact tables in this way for backup, the process of backing up a data warehouse can be made more efficient overall.

9 Claims, 5 Drawing Sheets

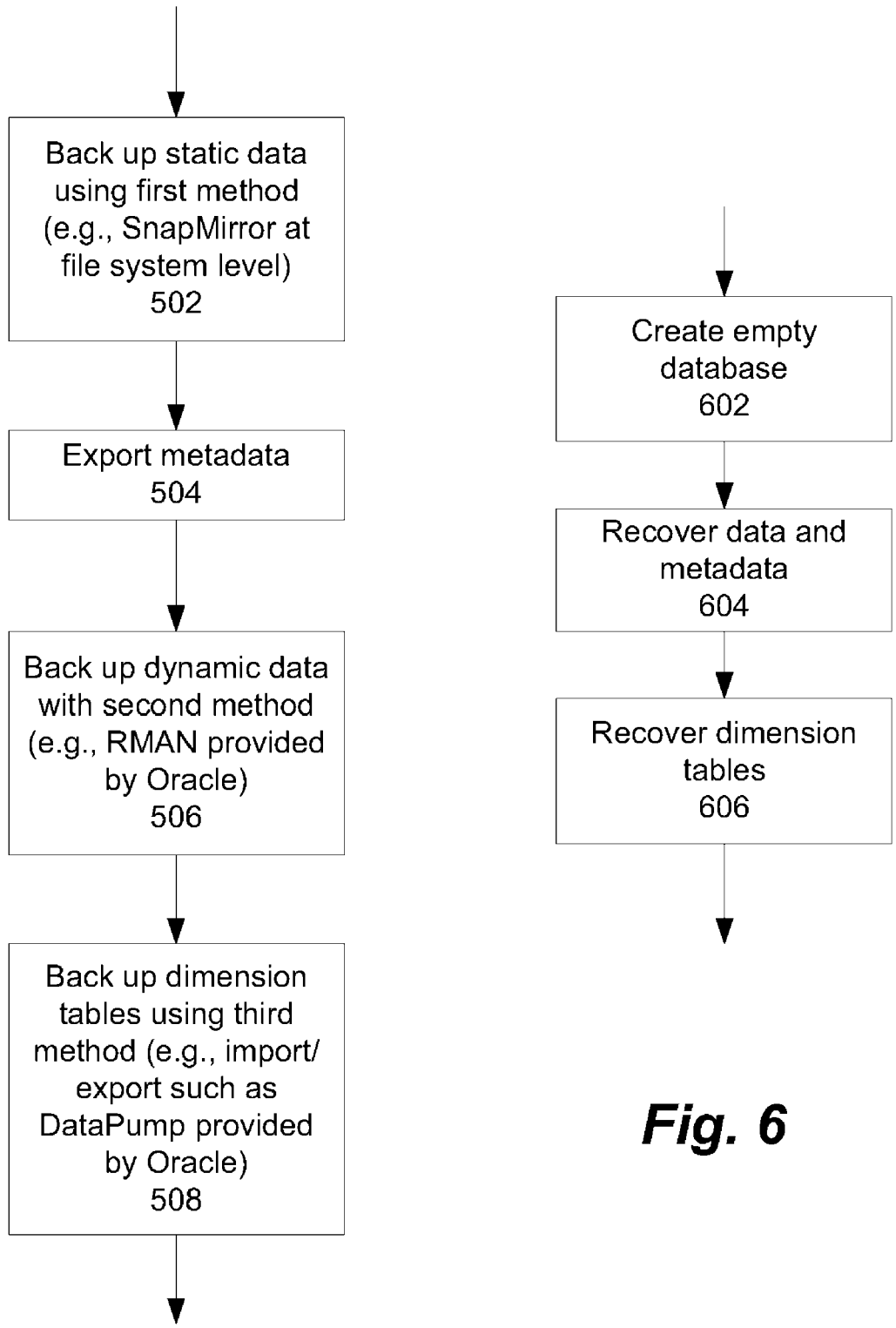

DIVIDED BACKUP OF DATA WAREHOUSE

BACKGROUND

A data warehouse is a repository of historical data of an enterprise. For example, the data warehouse may be used by the enterprise to make forward-looking business decisions based on historical performance of the enterprise. An underlying implementation of a data warehouse may be, for example, a commercially available relational database, such as provided by Oracle Corporation. An example use of a data warehouse is a database maintained by a retailing chain, for which records of retail transactions are periodically (e.g., nightly) uploaded from computers of each store of the chain.

It is desirable to backup a data warehouse such that, in the event of corruption, failure or some other event with respect to the data warehouse, the data warehouse can be restored from the backup. Data warehouses can typically contain very large amounts of data, on the order of terabytes or more. Backing up such large amounts of data can be very time consuming. Furthermore, restoring such large amounts of data can also be very time consuming.

For example, a database may be put into "hot backup" mode and the data files copied to backup storage, such as tapes or backup disc storage. An example of a backup utility is one, provided by Oracle Corporation, known as Oracle Recovery Manager (RMAN). To support RMAN or hot backups, the database is typically configured to generate archive logs during the process of data loading. As such, every data modification (e.g., insert, update and delete) causes transactions to be logged, which are then archived in order to support a later database recovery.

The generation of archive logs can use substantial processing and input/output resources, which can impact the process of data loading (e.g., can slow the process of data loading or can necessitate the use of additional resources for the data loading). In addition, a large amount of data may be generated for the archive logs themselves, which can use a large amount of disc space.

SUMMARY

A method in accordance with an aspect is to backup a data warehouse characterized by a plurality of fact tables and at least one dimension table. For fact tables that are static, those fact tables are backed up using a first backup method that is, for example, optimized for static data. For example, the first backup method may be at the file system level, below the database level, and can be a very time and computationally efficient way to synchronize blocks of data. Thus, for example, the first method may be a method that is not "database-aware" and does not consider the database structure in its backup processing.

For fact tables that are dynamic, those fact tables are backed up using a second backup method. For example, the second backup method may account for the dynamic nature of data in the portion being backed up by being, for example, "database aware." In addition, the at least one dimension table is backed up.

By treating the fact tables in this way for backup, the process of backing up a data warehouse can be made more efficient overall.

BRIEF DESCRIPTION OF THE DRAWINGS

FIG. 5 is a flowchart that illustrates an example of steps to backup a database.

FIG. 6 is a flowchart that illustrates an example of steps to recover a database that has been backed up, for example, using the step illustrated in the FIG. 5 flowchart.

DETAILED DESCRIPTION

In accordance with an aspect, backup of a data warehouse is logically divided (e.g., bifurcated) such that data of static portions are backed up using a first method (which, for example, can achieve efficiencies due to the static nature of data in the portion being backed up) and such that data of dynamic portions are backed up using a second method (which accounts for the dynamic nature of data in the portion being backed up).

Figure 1:
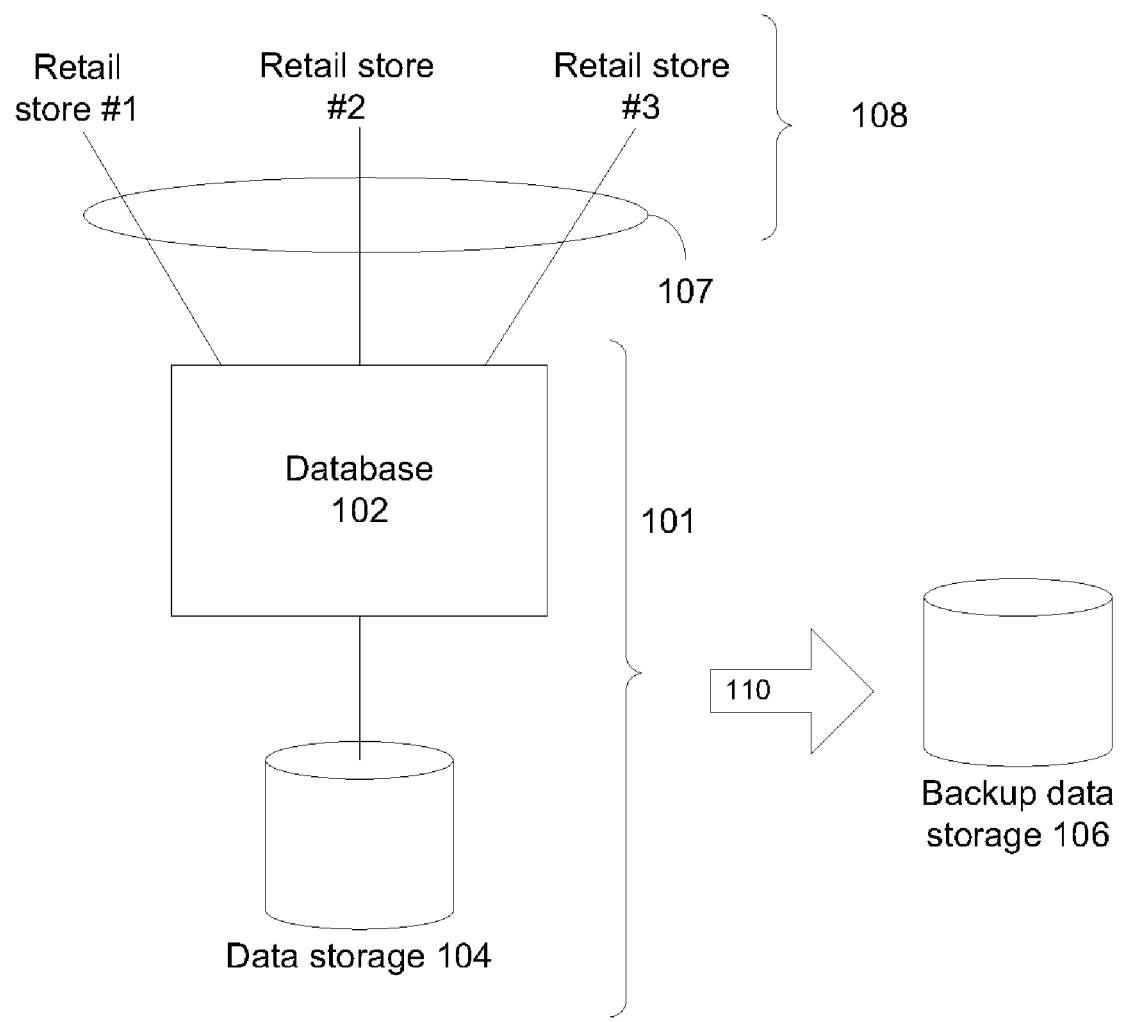
FIG. 1 is a block diagram broadly illustrating a data warehouse and a data warehouse backup FIG. 2 provides some additional illustration, in accordance with an example, of transaction data and an organization of data storage of a database.

FIG. 1 is a block diagram broadly illustrating a data warehouse and a data warehouse backup. In the FIG. 1 example, a data warehouse 101 is a database maintained by a retailing chain. Data recording retail transactions are periodically (e.g., nightly) uploaded from computers of the retail stores 108 of the retailing chain via load transactions 107. The primary database 101 includes a database server 102 and data storage 104. In general, the data is stored in the data storage 104 in a tabular format. Examples of storing data in a tabular format are well-known in the database art. A backup process 110 may operate to back up the data storage 104 to the backup data storage 106. As mentioned in the background, there may be a number of reasons for which a back up of data storage of a database is useful.

Figure 2:
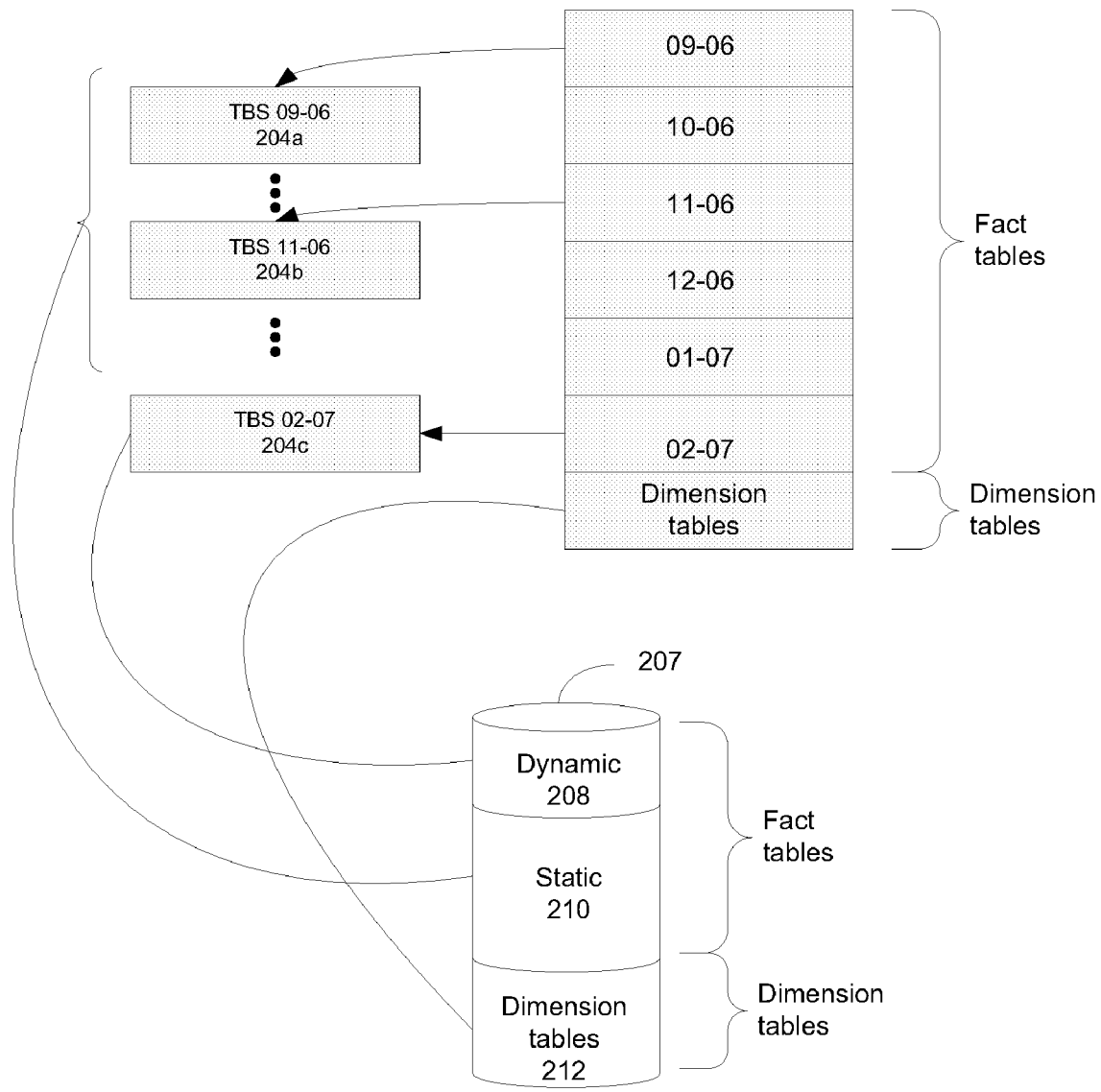

FIG. 2 provides some additional illustration, in accordance with an example, of transaction data and an organization of data storage of a database. Referring to FIG. 2, items of transaction data 202 are characterized at least by a month associated with the transaction data items. For example, the month characterizing a transaction data item may be the month in which a transaction represented by that transaction data item took place. FIG. 2 illustrates a tablespace 204a that includes data items for transactions that are characterized by the month 09-06 (i.e., September 2006). In the FIG. 2 example, data for transactions of a particular month are organized to be in a table partition characterized by that particular month. Thus, as another example, the tablespace 204a includes data items for transactions that are characterized by the month 11-06 (i.e., November 2006).

As particular load transactions are carried out with respect to the database, the loaded transaction data are stored into a table for the current month that is stored in a "dynamic" partition 208 of the data storage 207. That is, the dynamic partition 208 is configured to be read/write such that additional transaction data for the current month can be loaded into the dynamic partition 208. Meanwhile, the partitions 210 of the data storage 207 holding tables for months that have passed are static. That is, the partitions 210 are read only, such that no additional transaction data can be loaded (nor, in general, would it be necessary to load additional transaction data for months that have passed).

In the FIG. 2 illustration, it is assumed that the current month is February 2007, so that data items of transactions characterized by the month of 02-07 are stored into the dynamic partition 208 of the data storage 207. In addition, it can be seen from FIG. 2 that data items of transactions characterized by months prior to 02-07 are stored into the static partition 210 of the data storage 207.

FIG. 2 also illustrates dimension tables stored in a partition 212 of the data storage 207. Dimension tables define attributes that are usable in processing queries to a dimensionally-modeled database (which may, in fact, have an underlying implementation as a relational database). In many cases, the dimension tables are static (or relatively static) and, thus, the partition 212 may be a static partition.

Figure 3:
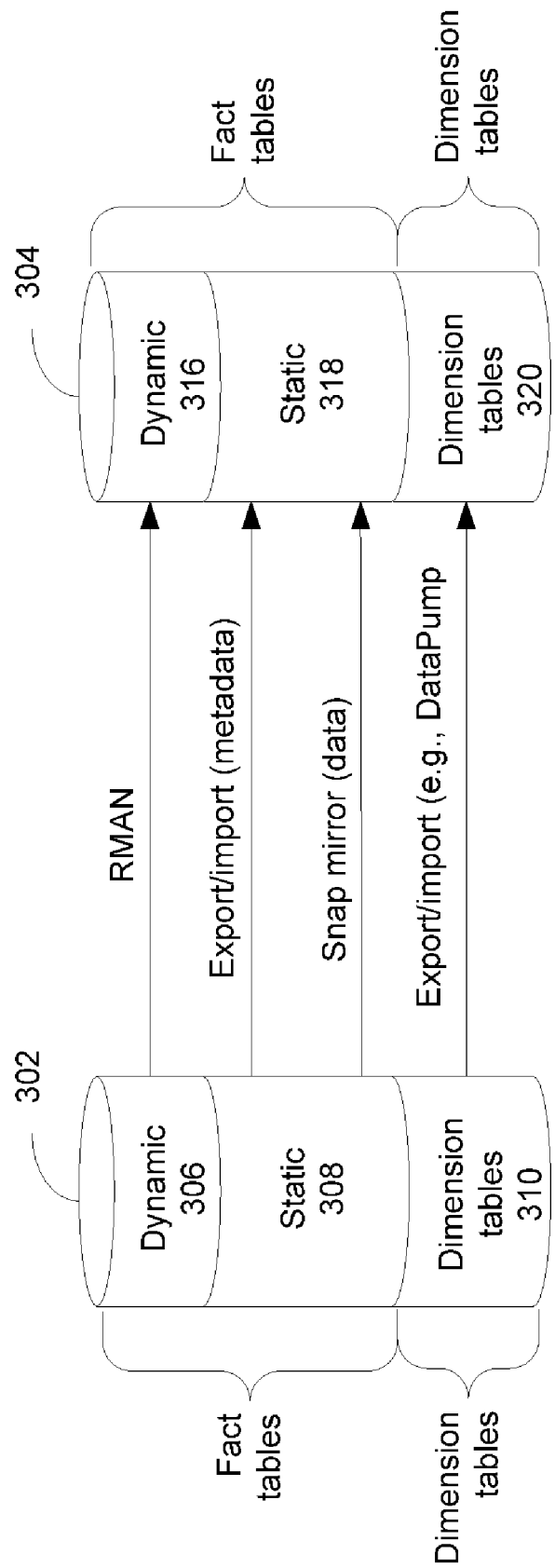
FIG. 3, which schematically illustrates an example of how data storage of a primary database may be backed up to a backup data storage in accordance with an aspect of the invention.

We now turn to FIG. 3, which schematically illustrates an example of how data storage 302 of a primary database may be backed up to a backup storage 304 in accordance with an aspect of the invention. Similar to the discussion relative to FIG. 2, the primary storage 302 includes one or more dynamic partitions 306 and one or more static partitions 308. In the FIG. 3 example, a static partition for dimensional tables is separately provided.

Referring still to FIG. 3, the one or more static partitions 308 are backed up to a portion 318 of the backup storage 304 using a first method. In the FIG. 3 illustration, the second method uses "SnapMirror®" software provide by Network Appliance. The SnapMirror software operates at the file system level, below the database level, and is a very time and computationally efficient way to synchronize blocks of data. Thus, for example, the first method may be a method that is not "database-aware" and does not consider the database structure in its backup processing.

Additionally, the one or more dynamic partitions 306 are backed up to a partition 316 of the backup storage 304 using a second method. In the FIG. 3 illustration, the second method is a version of the Oracle Recovery Manager (RMAN). Thus, for example, the second method may be a "database-aware" method that considers the database structure characterizing the data of the backed up partitions in its backup processing.

Furthermore, it is noted that, for example, backups of the one or more static portions 308 after the first backup may be incremental in nature (e.g., as a product of using the synchronization methodology of the SnapMirror software) such that relatively small amounts of data (or no data) of the static partitions 308 are transferred to the backup storage 304 on the subsequent backups.

Metadata regarding the data items (e.g., metadata may be data that describes the data items and/or their organization) in the one or more static partitions 308 may be backed up, for example, using an export/import method (such as using the DataPump functionality provided by Oracle). The amount of metadata is typically relatively much less than the data itself and, so, the metadata export method can typically be accomplished very quickly.

Also shown in FIG. 3 is the partition holding the dimension tables being backed up. The one or more partitions 310 holding the dimension tables are also backed up. In the FIG. 3 example, the one ore more partitions 310 are backed up using an export/import method (such as DataPump). For example, even though these partitions would generally be static, the amount of data to be backed up is relatively small and can be efficiently handled using a database-aware backup method. In some examples, though, partitions holding dimension tables may be backed up using a method that is not database-aware.

Figure 4:
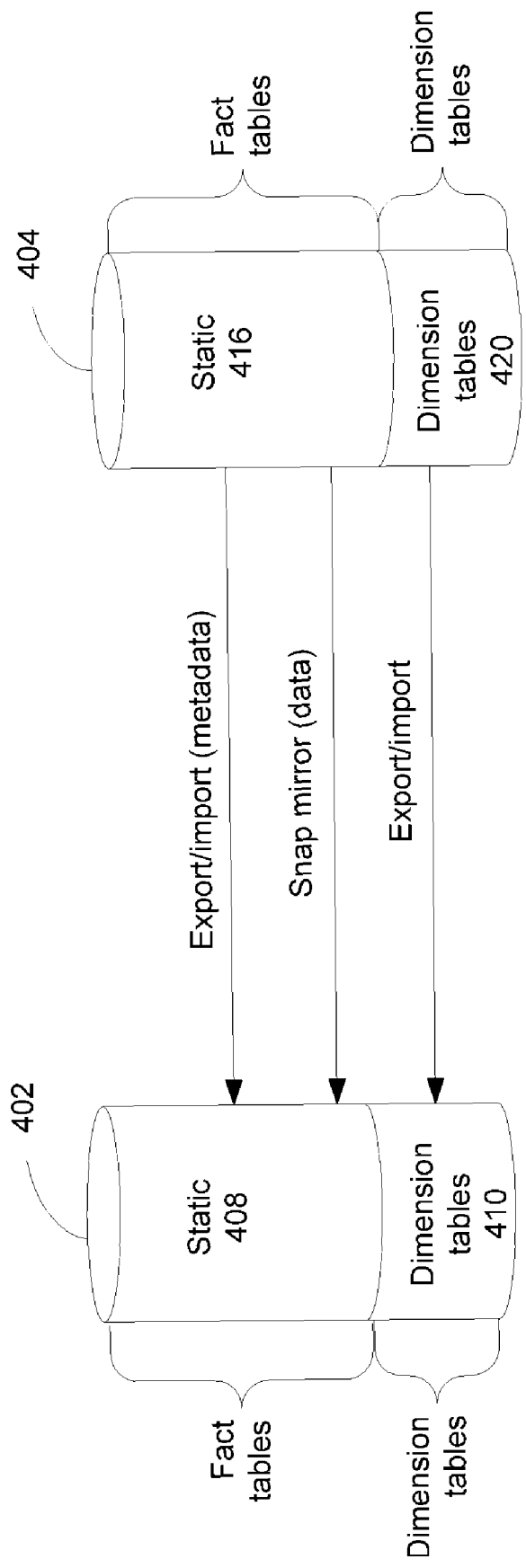
FIG. 4 schematically illustrates an example of how data of a backup data storage may be restored to a primary data storage of a database in accordance with an aspect of the invention.

FIG. 4 schematically illustrates an example of how data of a backup data storage 404 may be restored to a primary data storage 402 of a database in accordance with an aspect of the invention. An empty database may be created with respect to the primary storage 402. The data of the database may be restored using the SnapMirror software or other file level methodology. The metadata may be restored using the export/import functionality (e.g., as provided by Oracle). The dimension tablespace data may be restored using, for example, the DataPump functionality.

FIG. 5 is a flowchart that illustrates an example of steps to backup a database. At step 502, the static data is backed up using a first method, such as using the SnapMirror software to back up the static data at the file system level. At step 504, the metadata is backed up, such as using a database-aware method, which may be, for example, export/import (DataPump) functionality provided by Oracle (for an Oracle-provided database). At step 506, the dynamic data is backed up using a second method using, for example, the RMAN functionality provided by Oracle. At step 508, the dimension tables associated with the database may be backed up using, for example, the export/import (DataPump) functionality provided by Oracle.

A database that has been backed up may also be recovered as desired or required, for example. One example of database recovery is described with reference to the FIG. 6 flowchart. At step 602, an empty database is created. At step 604, the data and metadata are restored from the backup data storage to the primary data storage using, for example, a restore methodology at the file-system level, such as the SnapMirror methodology. At step 606, the dimension tables are restored from the backup data storage to the primary data storage using, for example, the DataPump import facility provided by Oracle.

We have thus described a method and system in which backup of a data warehouse is logically divided (e.g., bifurcated) such that data of static portions are backed up using a first method (which, for example, can achieve efficiencies due to the static nature of data in the portion being backed up) and such that data of dynamic portions are backed up using a second method (which accounts for the dynamic nature of data in the portion being backed up). Thus, for example, archived logs (and the overhead involved in generating them) may not be needed.

What is claimed is:

1. A computer-implemented method to backup a data warehouse characterized by a database comprising a plurality of fact tables and at least one dimension table, the database characterized by a database structure, the method being executed by at least one computing device, and the method comprising:

for fact tables of the database that are static as characterized by being indicated in the database as read-only, by the at least one computing device executing computer program instructions stored in a computer-readable medium, backing up those fact tables of the database using a first backup method, at a file system level underlying the database structure, without consideration of the database structure;

for fact tables of the database that are dynamic, as characterized by being indicated in the database as read/write, by the at least one computing device executing computer program instructions stored in a computer-readable medium, backing up those fact tables using a second backup method, at a database level, with consideration of the database structure; and by the at least one computing device executing computer program instructions stored in a computer-readable medium, backing up the at least one dimension table.

2. The method of claim 1, further comprising:
by the at least one computing device executing computer program instructions stored in a computer-readable medium, backing up the at least one dimension table using a third backup method, wherein the at least one dimension table defines attributes that are configured to process queries to the fact tables of the database.

3. The method of claim 1, wherein:
the database is organized such that fact tables that are static are fact tables that include facts for a time period that is entirely in the past and fact tables that are dynamic are fact tables that include facts for a time period that is at least partially in the future.

4. A computer system including at least one computing device configured to execute instructions to backup a data warehouse characterized by a database comprising a plurality of fact tables and at least one dimension table, the database characterized by a database structure, the at least one computing device configured to:
for fact tables that are static as characterized by being indicated in the database as read-only, by the at least one computing device, execute computer program instructions stored in a computer-readable medium to back up those fact tables of the database using a first backup method, at a file system level underlying the database structure, without consideration of the database structure;
for fact tables of the database that are dynamic, as characterized by being indicated in the database as read/write, by the at least one computing device, execute computer program instructions stored in a computer-readable medium to back up those fact tables using a second backup method, at a database level, with consideration of the database structure; and
execute instructions to back up the at least one dimension table.

5. The computer system of claim 4, wherein the at least one computing device is further configured to:
execute computer program instructions stored in a computer-readable medium to back up the at least one dimension table using a third backup method, wherein the at least one dimension table defines attributes that are configured to process queries to the fact tables of the database.

6. The computer system of claim 4, wherein:
the database is organized such that fact tables that are static are fact tables that include facts for a time period that is entirely in the past and fact tables that are dynamic are fact tables that include facts for a time period that is at least partially in the future.

7. A computer program product to backup a data warehouse characterized by a database comprising a plurality of fact tables and at least one dimension table, the database characterized by a database structure, the computer program product comprising a computer readable medium having computer program instructions tangibly embodied thereon to configure at least one computing device to:
for fact tables of the database that are static as characterized by being indicated in the database as read-only, by the at least one computing device, execute the computer program instructions stored in the computer-readable medium to back up those fact tables of the database using a first backup method, at a file system level underlying the database structure, without consideration of the database structure;
for fact tables of the database that are dynamic, as characterized by being indicated in the database as read/write, by the at least one computing device, execute the computer program instructions stored in the computer-readable medium to back up those fact tables using a second backup method, at a database level, with consideration of the database structure; and
by the at least one computing device, execute the computer program instructions stored in the computer-readable medium to back up the at least one dimension table.

8. The computer program product of claim 7, wherein the computer program instructions are further to configure the at least one computing device to:
by the at least one computing device, execute the computer program instructions stored in the computer-readable medium to back up the at least one dimension table using a third backup method, wherein the at least one dimension table defines attributes that are configured to process queries to the fact tables of the database.

9. The computer program product of claim 7, wherein:
the database is organized such that fact tables that are static are fact tables that include facts for a time period that is entirely in the past and fact tables that are dynamic are fact tables that include facts for a time period that is at least partially in the future.

* * * * *